United States Patent
Chen et al.

(10) Patent No.: US 8,112,408 B2
(45) Date of Patent: Feb. 7, 2012

(54) SYSTEM AND METHOD FOR GENERATING A USER-DEFINED FUNCTION USING A SHELL

(75) Inventors: Qiming Chen, Cupertino, CA (US); Meichun Hsu, Los Altos Hills, CA (US); Rui Llu, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 12/510,933

(22) Filed: Jul. 28, 2009

(65) Prior Publication Data

US 2011/0029551 A1 Feb. 3, 2011

(51) Int. Cl.
G06F 17/30 (2006.01)
(52) U.S. Cl. .................................................. 707/706
(58) Field of Classification Search .............. 707/4, 202, 707/706; 709/223
See application file for complete search history.

(56) References Cited

U.S. PATENT DOCUMENTS

2005/0055384 A1* 3/2005 Ganesh et al. ................. 707/202
2006/0242136 A1* 10/2006 Hammond et al. ............... 707/4

OTHER PUBLICATIONS

Tasso Argyros, "How Aster In-Database MapReduce Takes UDF's to the next Level", http://www.asterdata.com/, Aug. 27, 2008.
Ronnie Chaiken, Bob Jenkins, Per-Ake Larson, Bill Ramsey, Darren Shakib, Simon Weaver, and Jingren Zhou, "Scope: Easy and Efficient Parallel Processing of Massive Data Sets", Microsoft Corporation, VLDB '08, Aug. 24-30, 2008, pp. 1-12, Auckland, New Zealand.
Qiming Chen and Meichun Hsu, "Inter-Enterprise Collaborative Business Process Management", Hewlett Packard Co., Software Technology Laboratory, HP Laboratories Palo Alto, Aug. 17, 2000 pp. 1-18.
Brian F. Cooper, Raghu Ramakrishnan, Utkarsh Srivastava, Adam Silberstein, Philip Bohannon, Hans-Arno Jacobsen, Nick Puz, Daniel Weaver and Ramana Yerneni, "PNUTS: Yahoo!'s Hosted Data Serving Platform", Yahoo! Research, VLDB '08, Aug. 24-30, 2008, Auckland, New Zealand.
Umeshwar Dayal, Meichun Hsu, and Rivka Ladin, "A Transactional Model for Long-Running Activities", Proceedings of the 17th International Conference on Very Large Data Bases, Sep. 1991, pp. 113-122, Barcelona.
David J. Dewitt, Eric Robinson, Srinath Shankar, Erik Paulson, Jeffrey Naughton, Andrew Krioukov, and Joshua Royalty, "Clustera: An Integrated Computation and Data Management System" PVLDB '08, Aug. 23-28, 2008, Auckland New Zealand.
Jim Gray, David T. Liu, Maria Nieto-Santisteban, Alexander S. Szalay, David Dewitt, and Gerd Heber, "Scientific Data Management in the Coming Decade", Technical Report MSR-TR-2005-10, Microsoft Research, Jan. 2005, Redmond, Washington.
Michael Isard, Mihai Budiu, Yuan Yu, Andrew Birrell, and Dennis Fetterly, "Dryad: Distributed Data-Parallel Programs from Sequential Building Blocks", EuroSys '07, Mar. 21-23, 2007, Lisboa, Protugal.
David G. Lowe, "Distinctive Image Features from Scale-Invariant Keypoints", International Journal of Computer Vision, Jan. 5, 2004, pp. 1-28.

(Continued)

*Primary Examiner* — Etienne Leroux (57) ABSTRACT

A method is provided for generating a user-defined function (UDF) on a database engine of a database server. A user-function is sent to the database engine. The user-function includes a relational declaration with application and query logic. When the database engine receives the user-function, the database engine generates a function shell. The UDF processes the relational declaration of the user-defined function. The UDF includes the user-function and the function shell. The function shell returns a final data result of the user-defined function through the shell from the database engine.

20 Claims, 8 Drawing Sheets

OTHER PUBLICATIONS

Brian Moran, "UDFs Endanger Performance", http://www.sqlmag.com/Articles/Print.cfm?ArticleID=42139, Mar. 25, 2004.

J. Zhang, M. Marszalek, S. Lazebnik, C. Schmid, "Local Features and Kernels for Classification of Texture and Object Categories: A Comprehensive Study", International Journal of Computer Vision, Sep. 2006.

Qiming Chen and Yahiko Kambayashi, "Nested Relation Based Database Knowledge Representation", ACM, pp. 328 to 337, 1991.

Michael Jaedicke and Bernhard Mitschang, "User-Defined Table Operators: Enhancing Extensibility for ORDBMS", Proceedings of the 25th VLDB Conference, Edinburgh, Scotland, 1999, pp. 494 to 505.

Wo. O'Connel, I.T. Ieong, D. Schrader, C. Watson, G. Au, A. Biliris, S. Choo, P. Colin, G. Linderman, E. Panagos, J. Wang, and T. Walter, "A Teradata Content-Based Multimedia Object Manager for Massively Parallel Architectures", Proc. of ACM-SIGMOND 1996 Int'l conference on Management of Data, Montreal, Canada, pp. 68-78.

Carlos Ordonez and Javier Garcia-Garcia, "Vector and Matrix Operations Programmed with UDFs in a Relational DBMS", CIKM '06, Nov. 5-11, 2006, Arlington, Virginia, pp. 503-512.

Chen, Qiming et al., "Correlated Query Process and P2P Execution", Globe '08 Proceedings of the 1st international conference on Data Management in Grid and Peer-to-Peer Systems (Sep. 3, 2008) pp. 1-10.

Chen, Qiming et al., "Data-Continuous SQI Process Model", OTM '08 Proceedings of the OTM 2008 Confederated International Conferences, CoopIS, DOA, GADA, IS, and ODBASE 2008 (Nov. 10-14, 2008) pp. 1-18.

Dean, Jeff, "Experiences with MapReduce, an Abstraction for Large-Scale Computation" PACT-2006, Seattle, Washington (Sep. 16-20, 2006) pp. 1-43.

\* cited by examiner

SYSTEM AND METHOD FOR GENERATING A USER-DEFINED FUNCTION USING A SHELL

BACKGROUND

Databases are used to store and retrieve data. Data is retrieved through a data request called a query. The retrieved data can be selected, sorted, and organized based on the query. Sometimes the retrieved data has further computations or analytics applied beyond the query functions of the database language. Running these computations is often performed on a processor external to the database, such as a user, calling, or client device.

Running data-intensive analytic computations outside the database causes significant overhead in data access and transfer, which can be a major performance bottleneck in business intelligence applications. Pushing-down data-intensive analytics to the database layer for fast data access and reduced data transfer has some challenges. While a query processing engine is technically sophisticated, the query processing engine is primarily used for relational query evaluation. More general applications rely on User Defined Functions (UDFs). However, the existing UDF technology suffers from some limitations. First, tuple-wise pipelined UDF execution restricts the capability or efficiency in dealing with complex applications, and a tuple-set input is not supported. Second, the UDFs are coded in non-SQL language such as C, which either involves hard-to-follow Database Management System (DBMS) internal system calls for interacting with the query executor or sacrifices performance by converting DBMS defined relation objects to strings in passing arguments.

Existing database systems can only use scalar, aggregate and table input for UDFs, where a scalar or aggregate function cannot return a set. An existing database table UDF is limited to a single-tuple argument. Further, existing UDFs are typically executed during query execution in the tuple-wise pipeline of query processing, which may prohibit in-function batch and parallel processing.

An existing UDF is run in the query processing environment with a number of interactions with the query executor for parsing parameters, converting data, and switching memory contexts. Efficiently executed UDFs may be coded using DB engine internal data structures and system calls, but analytics users may have to deal with hard-to-follow system details. Coding efficiently executed UDFs may be too difficult and cumbersome for a database analytics user due to the complexity of the database system data structures and system development language. Converting existing UDF input data to strings from system internal formats can cause significant overhead in converting data and parsing parameters.

DETAILED DESCRIPTION

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

Most conventional analytics platforms treat databases merely as a storage engine rather than a computation engine. As a result, the transfer of a massive amount of data between the storage platform and a computation platform can cause serious problems in performance and scalability. Relying on User Defined Functions (UDFs) to compute the analysis operations which are beyond the standard relational database operations, analytic computations may be pushed down to the database engine for faster data access and reduced data transfers.

Relation Valued Functions (RVFs) can be used to enhance the power of UDFs by removing hard-to-follow Database Management System (DBMS) internal data structures and system calls from user applications. A RVF can be schema aware user defined functions that contain relation inputs and relation output. In addition, RVFs make modeling complex applications using UDFs manageable where dataflow can be track through to a result.

The UDF technology extends both semantic terminology and system functionality. RVFs have UDF functionality tightly integrated with query processing but allow RVF developers to develop applications without having an understanding of DBMS internal system details. An RVF may contain two parts. First, an RVF shell can contain system utilities, and second, an RVF user-function can contain application logic without DBMS system calls. The term RVF shell, function shell, and shell may be used interchangeably.

RVF system support may be based on the notion of an invocation pattern, a mechanism for generating an RVF-shell automatically based on the schemas of the user-function's argument and return relations, and a data conversion protocol. RVF-shells may be generated based on invocation patterns. The header files for user-side relation object declarations may be automatically generated from the relation schemas of the invocation patterns. A set of pattern specific application programming interfaces (APIs) may be used by analytic users to write or create user-functions, which can be much simpler for analytic users to use and may use higher level application functions than the DBMS internal system calls of the query executor. A complete RVF-shell may be made by combining a user-function with application logic that is free of any DBMS internal data structures and system calls to form the RVF-shell. The generation of the RVF-shell may separate DBMS internal details from applications.

Figure 1:
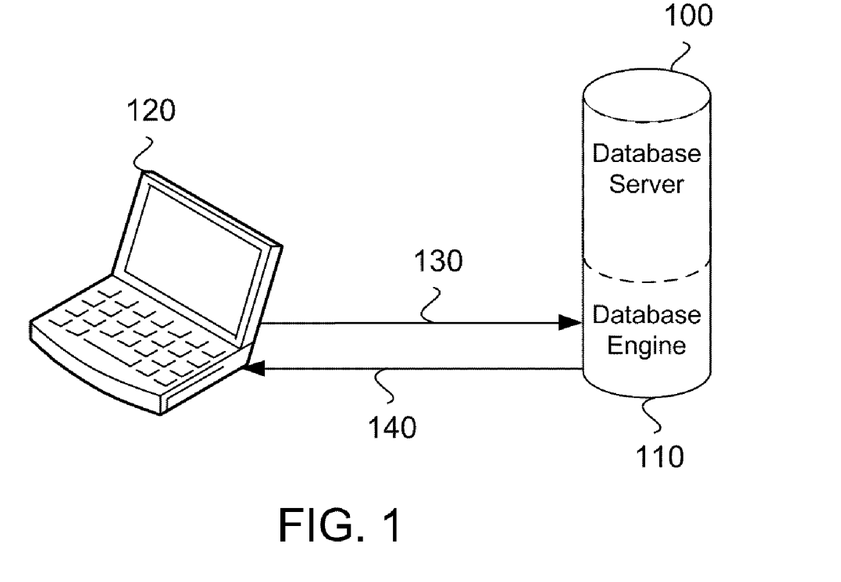
FIG. 1 is an illustration of a user-function sent to a database and a result returned from the database in accordance with an embodiment.

As illustrated in FIG. 1, a user of a calling device or user device 120 may send a user-function 130 to the database engine 100 on the database 110. The user-function may be a relational declaration with application logic that is free of any DBMS internal data structures and system calls. The database engine may generate a RVF shell when the database receives a user-function's relational declaration or relational query. The RVF shell may be any shell or interface operating on the database engine designed to be used with the user-function, where the shell has the functionality described herein. The RVF shell may process the user-function's relational declaration and return a result 140 to the user device after the user-function is processed by the database engine. The result may include a relational schema. The RVF shell may close after a last return of data of the result to the user device based on the user-function.

Figure 2:
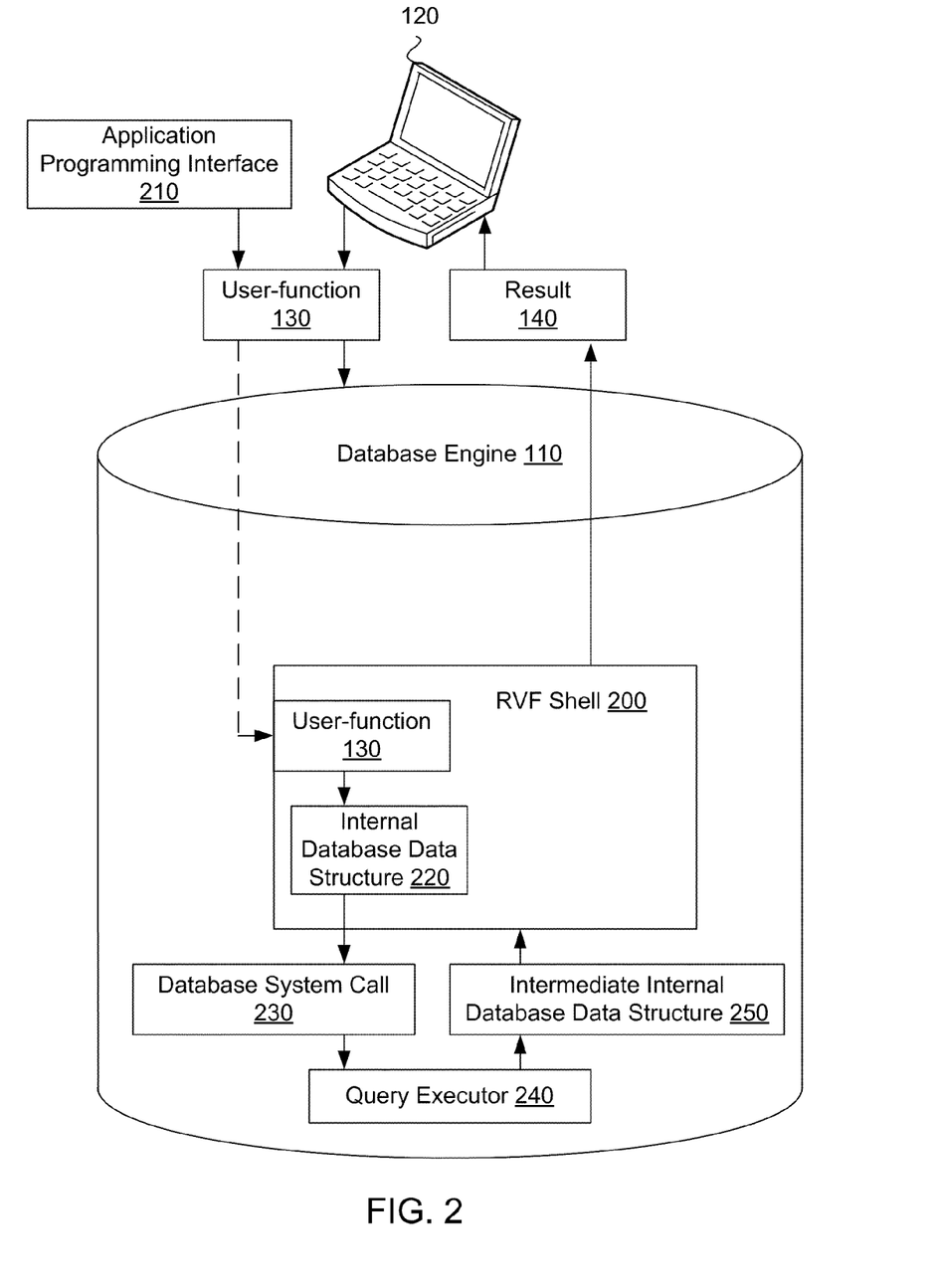
FIG. 2 is a block diagram of a shell generated when a user-function is received at the database server, and a query executor executing a database system call generated by the shell in accordance with an embodiment.

FIG. 2 provides another embodiment for generating a user-function 130 on a database engine 110 of a database server. A user may use an application programming interface (API) 210 to generate a user-function. The API may be a set of routines, data structures, object classes and/or protocols provided by libraries and/or database system services in order to support the building of user-functions or support shell functionality. APIs may be language dependent using a particular programming language and the particular syntax and elements of the programming language to make the API convenient to use in this particular context, such as a database language like C or C++ for database. APIs may also be language independent which allows the API to be applied to several programming languages.

A user-function may be sent to a database engine on database server from an application on a user device 120 or any device or application that can make a request to a database server. The application may be a client application. The user-function may contain a relational declaration which includes a relational schema input. The relational schema may include relational operators, sub-queries, and references to database tables. The relational declarations may include a series of non-nested relational schemas or non-nested queries.

After the user-function 130 is received by the database engine 110, the database engine generates a shell 200 to execute the user-function. The database engine may be the underlying software component that a database management system (DBMS) uses to create, retrieve, update and delete data from a database.

The relational declaration of the user-function 130 may be converted into a tuple data structure 220 that is used internal to the DBMS. A tuple may be a sequence or ordered list of database elements (columns) of finite length. An n-tuple may be a tuple with n elements. Tuples can be written within parenthesis. For example, (2, 7, 4, 1, 7) is a 5-tuple. A tuple data structure may be an array or list of elements.

The shell or function shell may call a database system function or call 230 using the DBMS tuple data structure 220. The database system call can be run on a query executor 240. The query executor may produce an intermediate result 250 (in contrast to a final result 140 that can be returned to a user device) that may be returned to the shell for further processing. Each relationship of the relational schema of the user-function may be stored in memory or cached before any queries or system calls are processed by the query executor. The system calls or queries of the shell may run on a plurality of database engines, database processors, query executors, or query processors.

The RVF shell 200 may initialize the values of each parameter of the DBMS tuple data structure with start values. The shell may maintain cross-call data from sub-queries relations and database system calls of the user-function between each execution of the query executor.

Figure 3:
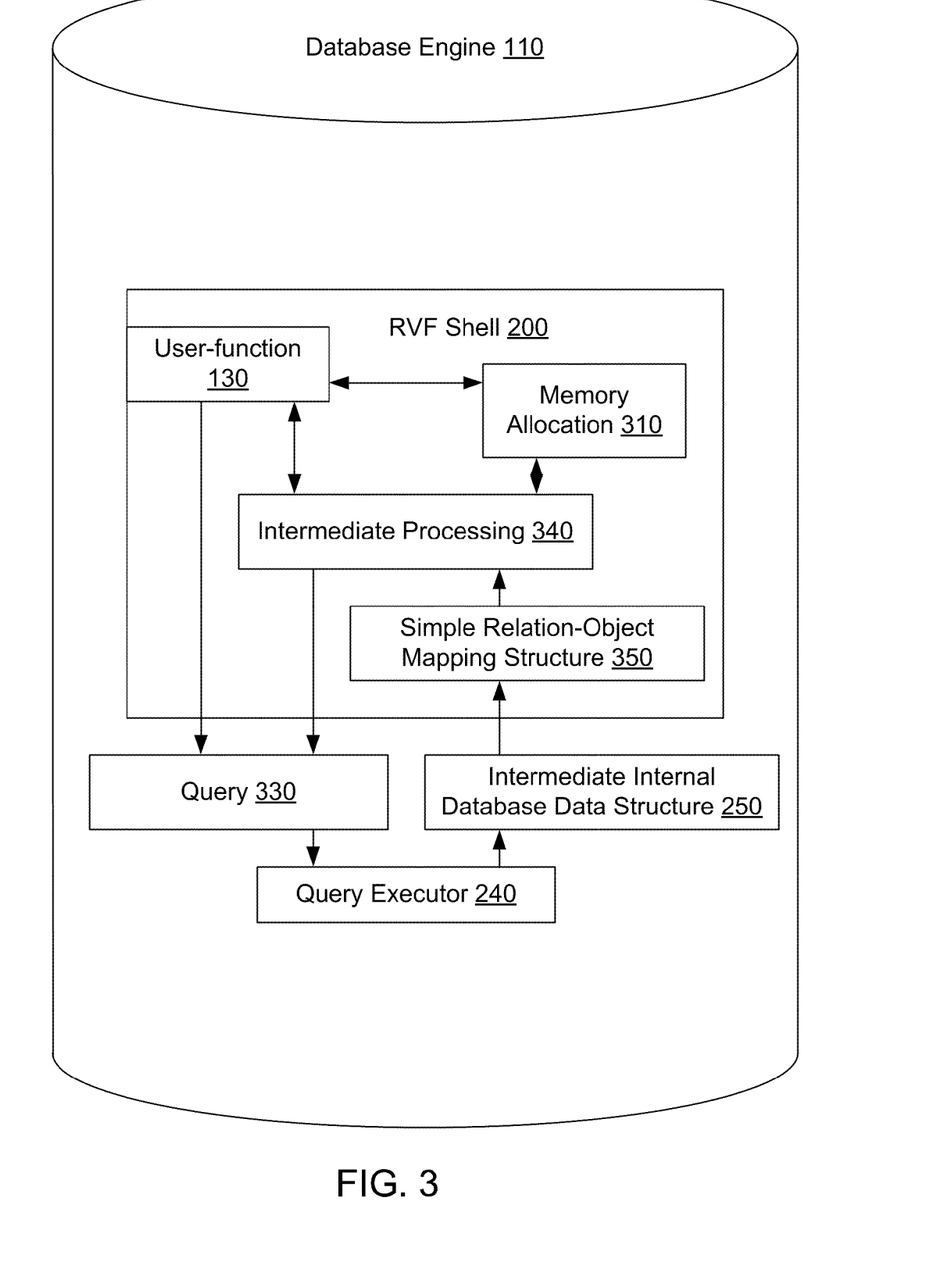
FIG. 3 is a block diagram of a shell generated when a user-function is received at the database server, and the shell converting an intermediate internal database data structure result from a query executor to a relation-object mapping structure in accordance with an embodiment.

In an embodiment as illustrated in FIG. 3, the RVF shell 200 may generate a query 330 from an argument in the user-function 130. The query executor may generate an intermediate result 250 after the query is sent to the query executor. The intermediate result may be presented in a data structure format utilized by and internal to the DBMS. The intermediate result may be returned to the RVF shell. The shell may convert the intermediate result into a simple relation-object mapping (SROM) structure 350. The SROM structure is a structure that can be processed and manipulated by the shell, but still maps to the underlying data of the intermediate result in the DBMS format used by the query executor. The SROM structure may be efficiently processed with a non-database programming language. The shell may perform intermediate processing 340 of the intermediate result, the relational declaration of the user function, and/or the arguments of the user-function expanded by the shell.

The shell may evaluate the relational declaration for syntax errors prior to or during processing the relational declaration. During processing the relational declaration, the shell may allocate memory 310 and release memory in a memory module according to the life-span of each data element of the relation or query in the relational declaration.

In another configuration, a user-defined function may be sent to the database engine with a relational function declaration, where the relational function declaration has application and query logic, a data mapping scheme, and an invocation pattern. An invocation pattern can be an input mode included in a user-function that can create an input data structure within the shell and generate a predefined function sequence for the UDF. A UDF may include the combination of a user-function and a RVF or function shell. An invocation pattern can be a return or output mode included in a user-function that can create an return or output data structure within the shell and generate a predefined function sequence for the UDF. The receipt of the user-function by the database engine may generate a shell. With the generation of the shell, the shell may also generate header files for the UDF and construct a shell structure with instructions on the frequency of calling each argument, tuple, or query referenced in the user-defined function. For example, the frequency may be a call for a first call, normal or repeat call, or last call of the query instruction.

Processing the user-defined function may include retrieving query relations based on the invocation pattern. The processing may include converting an application and query logic data structure to DBMS tuple data structure, and converting DBMS tuple data structure resulting from a query executor to a data structure that can be manipulated by application and query logic or a programming language, such as C or C++. The shell may allocate and de-allocate memory in a memory module according to a life-span of the relation or query in the user-defined function. Life-span of the relation or query may be determined by a one call, multi-call, or per-call in the user-defined function.

Supporting Relation-Valued Functions (RVF) at a database language level (e.g. SQL) allows RVF "patterns" to be explicitly declared for focused system support. An RVF pattern represents a specific mechanism for applying the RVF to its input relations. For example, passing in an input relation tuple by tuple or as a whole may represent different invocation patterns of invocation functions. Regulating RVF execution to well-defined patterns can ensure well-defined function behavior and system interface, which not only allows the system to optimally process the data flows involving RVFs, but makes providing high-level APIs for interacting with the DBMS possible.

In another embodiment, generating an RVF shell frees applications of making DBMS system internal calls. A shell may be embedded in a query executor, and an RVF invocation can interact with the query executor. During RVF invocation, the input relations can be checked for syntax errors and passed in to the RVF shell. Depending on the invocation pattern in processing one query, an RVF argument may be called once and return an entire tuple-set in the single call, or called multiple times, one for each returned tuple. Across multiple calls, the initial data used for every call and the carry-on data across calls, can be managed and maintained to reduce initialization of data.

The memory life span of RVF arguments and results can be managed for efficient memory use with RVF invocation. A RVF container may manage the interaction of the RVF shell with the query executor in terms DBMS internal system utilities. An RVF shell may contain DBMS system utilities. Generating the RVF-shell automatically allows the "user-function" to be plugged in the shell, where the user-function can contain the application logic without DBMS internal system calls. RVF-shells can vary from invocation pattern to invocation pattern although they may have common components. An RVF shell may be independent of the application code of the user-function.

The RVF shell may use a Simple Relation Object Mapping (SROM) protocol to convert the relation objects (e.g. tuple-sets) in DBMS specific data structures into simple C-structs or C++ objects (or other similar structures in other programming languages) explicitly defined in the header files generated from relation schemas. The simple structures may be used by the user-function for calculations and manipulations inside the RVF shell. An RVF shell may be generated, together with the above header files, based on the invocation pattern and the schemas of the argument relation. The actual DBMS specific relation objects passed in from the query executor may be converted to arrays of C-structs defined in the header files. The RVF developer may provide the plugged in user-function which is free of DBMS internal data structures and system calls.

A Detailed Embodiment

In another more detailed embodiment of the method and system of generating a UDF on a database engine of the database server over the limitations of the current UDF technology are illustrated. The method and system may provide formal support of relational input and outputs and may combine the easy-coding of UDF's user-functions with efficient UDF execution.

An RVF may be a type of a UDF. RVFs may be classified based on their "invocation patterns", which includes the mechanisms for dealing with input (e.g. passing in an input relation tuple by tuple, or as a whole) and return values (e.g. per-tuple return or set return). A well-defined invocation pattern with designated input-modes and return-modes can underlie the system interface and system support.

A function body, the code for system utilities, and the code for application logic may be interleaved in the RVF. A specific invocation pattern can make the steps of the system interaction deterministic, which makes it possible to single out the application logic from the system utilities and to abstract high-level APIs for interacting RVF execution with query processing.

A Simple Relation Object Mapping (SROM) protocol can be used to converting relation objects from their DBMS internal data structures into simplified ones to be manipulated by applications. SROM can be used to compose the User Defined Types (UDTs) from primitive types and collections provided by the DBMS. Using SROM, the data structure declarations in header files of the involved relation objects can be much simpler than the DBMS internal formats and can be generated from the corresponding relation schemas.

The RVF shell can distinguish the user's responsibility from the system's responsibility. RVF can be separated into at least two general parts: the RVF shell and the "user-function." First, the RVF-shell can contain the system utilities for running the RVF in the query processing environment, and second, the "user-function" can contain application logic but without DBMS internal system calls. An RVF shell can be created by plugging a user function in its shell. System utilities can be developed to generate an RVF shell from its function declaration, data mapping scheme and the designated invocation pattern.

Figure 4:
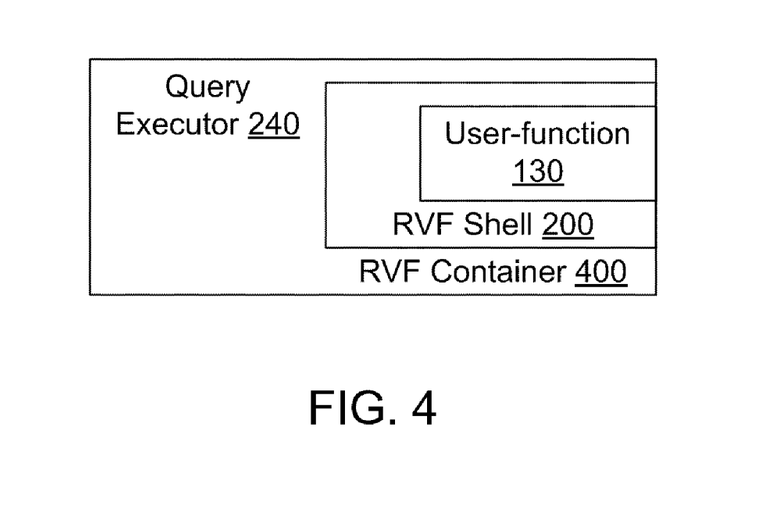
FIG. 4 is a block diagram of a shell generated when a user-function is received at a database in accordance with an embodiment.

FIG. 4 illustrates a configuration of a solution stack where an RVF shell (with header files) 200 is generated in a RVF container 400 within a query executor 240. The RVF developer may only be responsible for providing the plugged in user-function 130 which is free of DBMS internal data structures and system calls. The RVF developer may code RVF shells utilizing database system internal details beyond the knowledge or expertise of analytics users.

The user-function with its RVF shell on a query executor may be implemented on the open-sourced database engine, like Postgres, or on a commercial and proprietary parallel database engine, like SQL. RVFs can be used to intelligently to alleviate the shortcomings of SQL which is cumbersome in expressing data flow logic. Separating the RVF shell from the user-function and generating the shell automatically improves the system intelligence by scaling the UDF applications for data-intensive analytics.

Extend Relation Operation with Relation Valued Function

Relation Valued Functions (RVFs) can be used on relation-input, relation-output and database schema-aware functions. RVFs can allow data intensive applications to be executed inside the database engine for fast data access and reduced data movement, and where the RVFs can be composed with relational operators to form integrated dataflow pipelines. RVFs can be coded in non-database and non-SQL languages, such as C. RVFs have the advantage of expressive power, execution efficiency, and seamless integration with relational operators in database queries.

Expressive Power

For example, the set of tuples in a relation may represent a set of objects. When an application involves the inter-relationship and global behavior of these objects, coding the application in a typical UDF with per-tuple input can be cumbersome and difficult. The difficulty can be illustrated by the Minimum Spanning Tree (MST) problem shown in FIG. 5. The MST problem involves finding a spanning tree in a connected, undirected graph with weighted edges that connects all the vertices together with a weight less than or equal to the weight of every other spanning tree. The MST problem exists widely in pipeline planning, network designing, and business optimization.

Kruskal's Algorithm provides an approach to deal with the MST problem. The Kruskal's Algorithm briefly summarized is as follows. Sort the edges of G in increasing order by weight. Then, keep a subgraph M of G, initially empty for each edge e in sorted order. If the endpoints of e are disconnected in M, add e to M, then return M as the resulting MST.

Figure 5:
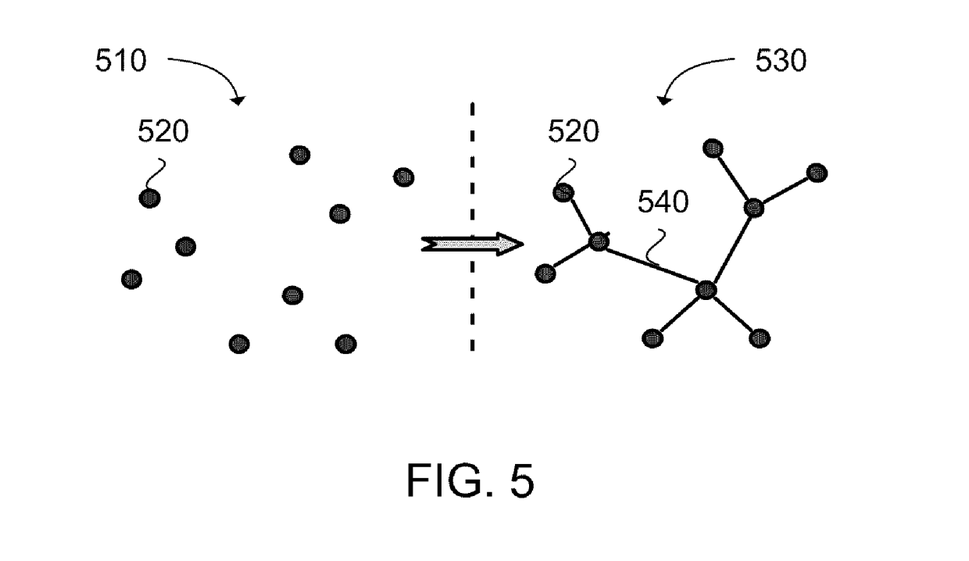
FIG. 5 is an illustration of a minimum spanning tree (MST) problem with vertices in a first table and edges in a second table in accordance with an embodiment.

Stored in a database, the vertices 520 can be kept in one table 510 and the edges 540 in second table. A UDF for solving the MST problem has input data read from these two tables and an output relation 530 generated to represent the edges of the MST. RVF supporting relation input/output overcomes the inability of a scalar UDF with tuplewise input for computing the MST.

Execution Efficiency

Tuple-wise computation by scalar UDFs can lead to performance penalties incurred from parameter setups of a large volume of calls and from repeatedly loading the data commonly used across calls. Analyzing the corner kick possibilities in a soccer game can illustrate the advantages of RVF over scalar UDFs.

In soccer games, a corner kick is awarded to the attacking team when the ball leaves the field of play by crossing the goal line without a score having been last touched by a defending player. A corner kick may result in a good scoring opportunity such as by a "header". The defending team may choose to form a wall of players in an attempt to force the ball to be played to an area which is more easily defended.

To analyze the strategies in taking and defending a corner statistically, a given collection of sample images of "typical" corner kick scenes can be ranked by their popularity through comparing them with a large set of images on corner kicks.

From each corner kick image, the SIFT features can be extracted which consist of hundreds to thousands of key points, where each corner kick image may be a 128-dimensional vector. The comparison may be on the similarity of the whole image, allowing the comparison to leverage the orderless bag-of-features model to avoid the data intensive processing of pairwise point matching. The corner kick analysis process can work as follows: In an image the key points, or SIFT feature vectors can be extracted and clustered. A histogram of key points in clusters can be generated as the signature of the image, which is itself can be a vector, referred to as the composite feature vector of the image. Then, the closeness of two images can be determined by the similarities of their composite feature vectors using a dot product. The computation can involve a large table of corner kick images represented by CKImages [ID, feature] and a small table of sample corner kick images, CKSamples [ID, feature], with the same schema. An image may have several feature vectors that can be composed into a single long vector. A UDT (User Defined Type) can be defined for feature vector. A function sim can compute the similarity of two images based on the similarity of their composite feature vectors.

The query Q1 represents problems with per-tuple basis of current conventional queries. The SQL query Q1 can first derive the closest sample image of each corner kick image (by maximal similarity), then for each sample image s calculate the number of corner images taking s as the closest sample and ranks the sample images by that number.

[Q1] SELECT Sid, COUNT(Neighbor) AS n FROM
(SELECT P.ID AS Neighbor, (SELECT S.ID FROM
CKSamples S
WHERE sim(P.feature, S.feature) = (SELECT
MAX(sim(P2.feature, S2.feature))
FROM CKSamples S2, CKImages P2 WHERE P2.ID =P.ID))
AS Sid FROM CKImages P)
GROUP BY Sid ORDER BY n;

For example p, the closest sample image of each corner-kick image, is computed by comparing p with all the sample images. Since the UDF, sim, is invoked on the per-tuple basis and unable to receive the whole CKSamples relation as input argument, then at least 2 efficiency problems can result. First, the CKSamples relation is not cached but retrieved for each CKImages instance p. And second, the CKSamples relation is also retrieved in a nested query for each (tuple) instance p of CKImages, for the MAX similarity between p and the sample images. Repeated relation retrieval can be a quantitative performance bottleneck. The kind of inefficient computation pattern illustrated in the example widely exists in database and SQL queries due to the lack of RVFs.

Composed with Relational Operators in Queries

The conventional scalar, aggregate and table UDFs are unable to express relational transformations and to be composed with other relational operators in a query since either their inputs or outputs are not relations. RVFs extend UDF technology for overcoming the scalar, aggregate and table UDF limitation. RVFs may allow UDFs with relation input and output. An RVF may have at least one input relation or tuple-set returned from a query. An RVF may be able generate a new relation as its output. With an input relation and output relation, the RVF may be viewed as a relational operator and a relation data source.

Figure 6:
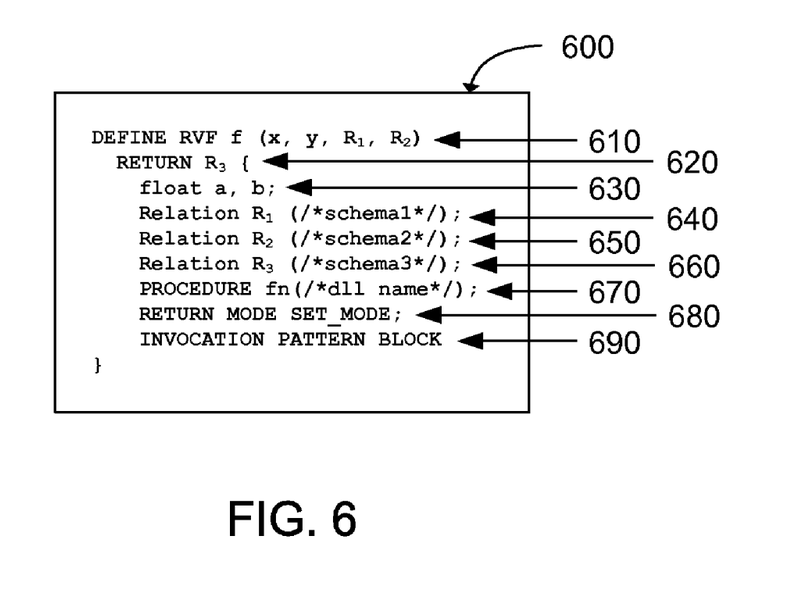
FIG. 6 is an example of a user-function definition in accordance with an embodiment.

An RVF may be defined as illustrated in FIG. 6. The relation schemas R1 640, R2 650 and R3 660 denote the "schema" of user-function f 600, the actual relation instances or query results compliant to those schemas can be bound to f as actual parameters. The BLOCK input mode 690 can mean the input relations are passed in at once. The SET return mode 680 can mean all the resulting tuples are returned at once. The RVF function f definition 610 may include a return relation R3 620, scalar variables 630, and a procedure fn 670.

In another embodiment, a user may provide a declaration to a system. A shell generator may generate the RVF shell according to the declaration on the user device. The user may write the user-function using the RVF on a user device. The user may deploy or send the user-function and RVF shell together to the database server as UDF. The user may invoke the UDF by sending a database or SQL query to database server. The SQL query may include the invocation of the UDF. During execution of the SQL inside database engine, the UDF may be invocated. During the invocation of the UDF, the RVF shell may input and output the data based on invocation, definition, or declaration of the user-function.

RVFs can be composed with other relational operators or sub-queries in a database query. The relation arguments of an RVF can be expressed by queries represented by query Q2 and illustrated in FIG. 7. Q2 expresses dataflow pipelines of an application where Q1 720, Q2 730, Q3 740, and Q4 750 are queries in RVF functions rvf1 700 and rvf2 710.

Figure 7:
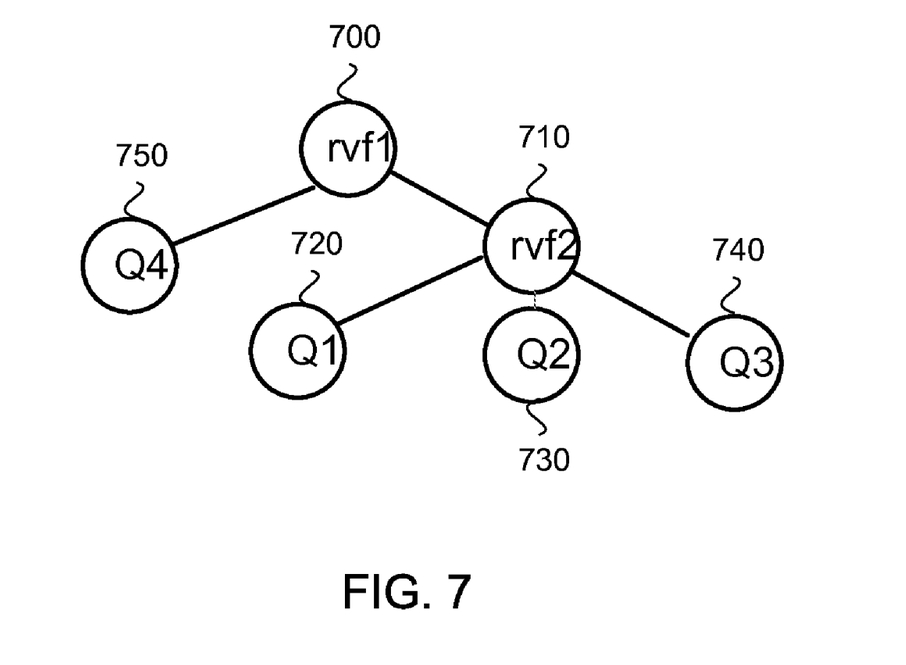
FIG. 7 is an illustration of user-functions used with queries in accordance with an embodiment.

[Q2] SELECT*FROM rVf$_1$(Q$_4$, rvf$_2$(Q$_1$, Q$_2$, Q$_3$));

The RVF may have capability of receiving chunks of initial data in addition to stacking in data tuple by tuple, which can underlie efficient computation and open in-function parallel processing of using multi-cores or GPUs. The synergy of RVFs and other relational operators in queries extends the database and SQL framework for handling richer applications. RVF can be an extension at a database level or SQL level which is supported by extending the query processor, rather than using by ad-hoc user programs.

Invocation Pattern with Respect to Input Mode and Return Mode

In relational database engines, the argument of a relation operator of an RVF shell may be fed in tuple by tuple, or by a set of tuples. If an operator has any tuple-wise input, the operator may be called multiple times with respect to that input during execution. In a tuple-wise evaluated query, a parent operator may demand its child operator to return the "next" tuple, and recursively the child operator demands its own child operator to return the "next" tuple, recursively in a top-down demand driven and bottom-up dataflow fashion.

The relationship between RVFs and relational operators allows them to be invoked compositionally in a query and allows the notion of invocation pattern to be applied to RVFs. The input mode and return mode of an RVF may represent the specific mechanisms for applying the RVF to its input relations and to deliver the resulting relation.

PerTuple Input Mode can be a simple input mode. PerTuple can be defined such that applying PerTuple to RVF f with a single input relation R means f is to be invoked for every tuple in R or pipelined. In query Q3 illustrated in FIG. 8, RVF per_image_summery 800 may be applied to table CKSamples 810 and acts as the relation data source although per_image_summery is invoked under the PerTuple mode 820. The PerTuple input mode may be the only input mode under which the use of an RVF and a scalar UDF can be interchangeable.

Figure 8:
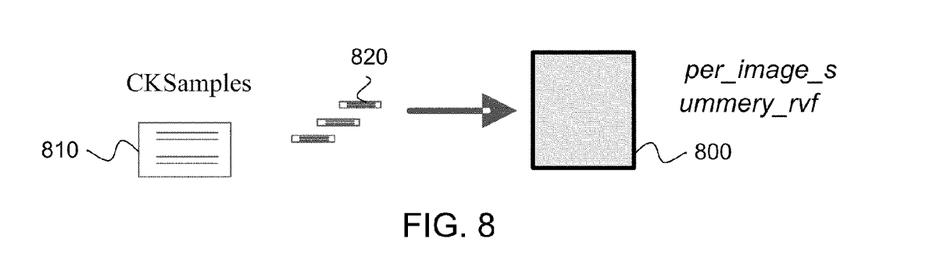
FIG. 8 is an illustration of a per tuple input mode in a user-defined function (UDF) in accordance with an embodiment.
Figure 9:
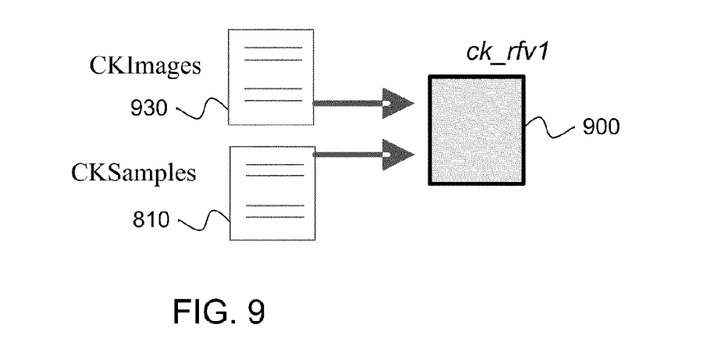
FIG. 9 is an illustration of a block input mode in a user-function in accordance with an embodiment.

[Q3] SELECT ID, Summary FROM
per_image_summery_rvf
("SELECT feature FROM CKSamples");

Under the Block Input Mode, as represented by query Q4 and illustrated in FIG. 9 for the corner-kick image ranking example, the RVF ck_rvf1 900 may be called only once in processing a query with both relations, CKImages 930 and CKSamples 810, cached. The block input mode allows for "in-RVF data parallel computation." When the input relation is sizable, block input invocation mode may cause the query to exceed the memory capacity of the database engine.

[Q4] SELECT r.sid, COUNT(r.neighbor) AS n FROM
ck_rvf1 ("SELECT * FROM CKImages",
"SELECT * FROM CKIsamples") r
GROUP BY r.sid ORDER BY n;

An input relation can be cached in a RVF as a whole when the relation is declared as static, which can be a default condition. An RVF may be treated as a block operation when the RVF's input relations are static.

Figure 10:
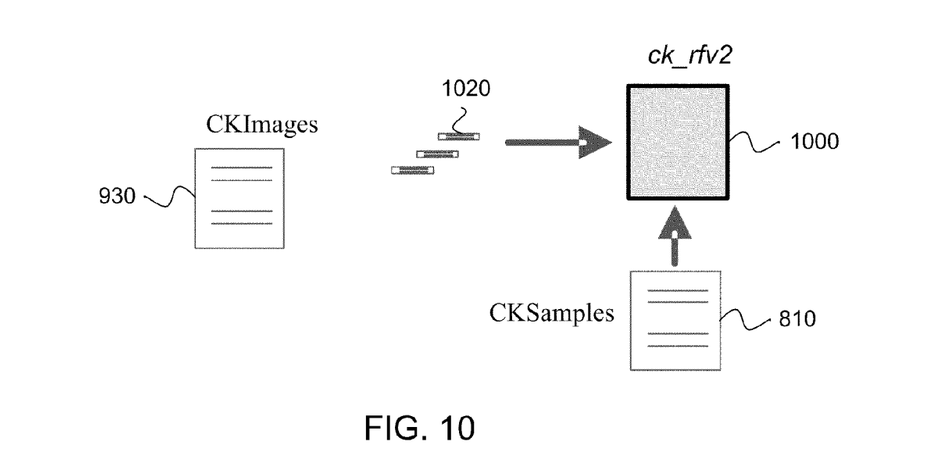
FIG. 10 is an illustration of a per tuple/block input mode in a user-function in accordance with an embodiment.

Under PerTuple/Block Input Mode, RVF f may be applied to 2 or more input relations where the first argument relation may be denoted by $R_{left}$, which can mean that f is to be invoked for every tuple in $R_{left}$ (pipelined) and in combination with the whole tuple-sets of other relations. In the above corner-kick image ranking example, the query Q5 with RVF ch_rvf2 1000 under the PerTuple/Block invocation mode may be executed image by image 1020 on the CKImages table 930, but may cache in all sample images of the CKSamples 810 table as the initial data, as illustrated in FIG. 10.

[Q5] SELECT Sid, COUNT(Neighbor) AS n FROM (
SELECT P.ID AS Neighbor, ck_rvf2 (P.ID, P.feature,
"SELECT * FROM CKIsamples") AS Sid
FROM CKImages P)
GROUP BY Sid ORDER BY n;

An RVF under Tuple Return Mode or TUPLE_MODE may return one tuple-per-call in multiple calls when invoked in a query, typically once for each input tuple. An RVF under Set Return Mode or SET_MODE may return the entire resulting tuple-set in a single call. Batch modes can be a return mode format between the Tuple Return Mode and Set Return Mode. Confining RVF invocation to designated input and return mode may allow focused system support of RVF execution with efficient query processing. With well-defined RVF execution characteristics, a user-function with an RVF shell can provide high-level APIs to remove DBMS internal details from users, and generate system code automatically to ease RVF development.

RVF Shell Separate from User-Function

A characteristic of an RVF can be the application logic. The RVF may utilize system support to execute the RVF in the query processing environment. The RVF system and method may use a RVF shell and an user-function where the RVF shell handles the interaction with query processing in parameter passing, data conversion, initial data preparation, memory management. The user-function may contain application logic and may be "plugged in" the shell. The RVF shell may provide some query processing functionality.

Figure 11:
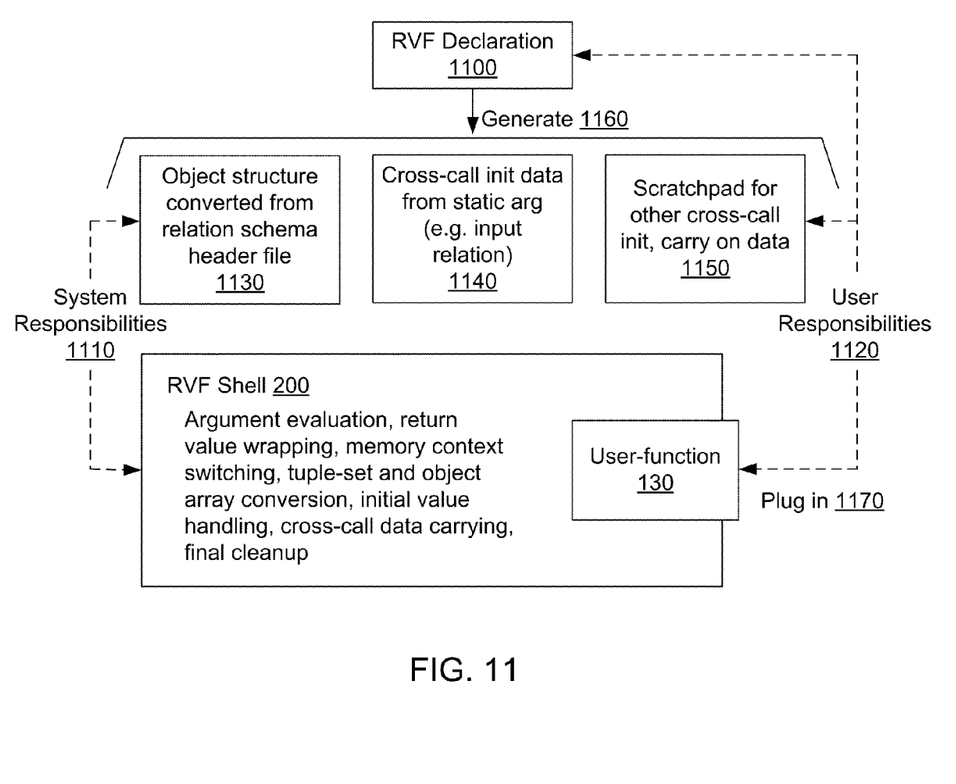
FIG. 11 is an illustration of a user's responsibilities and a system's responsibilities when generating a shell in accordance with an embodiment.

The RVF shell may provide for multi-calls. Like other relational operators, a user-function executed in a query may be called multiple times, one for each returned tuple. As illustrated in FIG. 11, the initial data 1140 used for every call and the carry-on data across calls, may be handled by the query executor through a function manager. A function may be coded with at least three cases: FIRST_CALL, NORMAL_CALL and LAST_CALL (also referred to as INIT_CALL, NEXT_CALL and FINAL_CALL). The FIRST_CALL may be executed only once in the first time the UDF is called in the hosting query which provides initial data. The NORMAL_CALL may be executed in each call including the first call, for doing the designated application. Multiple NORMAL_CALLs may be made if the UDF is called one tuple at a time, or a single NORMAL_CALL may be made if the UDF is called only once. LAST_CALL may be made after the last normal call for a cleanup purpose. The query executor may keep track the number of calls of the UDF during processing a query, and check the end-of-data condition for determining these cases.

The RVF shell may provide for memory context. Memory spaces allocated for function execution may have different life-spans. For example, the life-spans of RVF arguments or tuples may be per-query with one call, multi-calls, or per-call. When a function interacts with the query executor, switching memory context may be used.

The RVF shell may provide for argument passing. Each actual input argument may be instantiated. For example, if the argument is an expression then the argument may be evaluated. Dynamic arguments may be per-call evaluated at the function argument-evaluation phase. Static arguments may be instantiated or evaluated once in the FIRST_CALL. In RVF execution, when an argument represents a relation but is expressed by the user-function name or by a query statement, the corresponding static relation instance (not per-tuple input) may be retrieved in the FIRST_CALL once.

The RVF shell may provide for argument conversion. The basic data in query processing may be sets of tuples. The data may be represented in the query engine internal data structure for tuples and in the "user-function" application code which may be different. Application code may use a data structure that is simpler than the query engine internal data structure. Conversion can be made between the two formats used.

The RVF shell may provide for a return mode. An RVF may return a relation or tuple-set. The RVF shell may use the return modes of TUPLE_MODE for returning one tuple-per-call in multiple calls, once for each input tuple, and SET_MODE for returning the entire tuple-set in a single call. With the TUPLE_MODE, multiple NORMAL_CALLs may each generates one output tuple. With the SET_MODE, a single NORMAL_CALL may generate the entire output relation. In SET_MODE, the resulting tuples may be kept in a tuple-store or memory before returning the result.

The RVF shell may have functionality in the RVF execution with the host query processing. When an RVF is defined, the information may include the function name, arguments, input mode, return mode, and dll entry-point, which may be registered into the FUNCTIONS meta-table and the FUNCTION_PARAMS meta-table. The FUNCTIONS meta-table and the FUNCTION_PARAMS meta-table may be retrieved by the RVF shell programs.

When the RVF is invoked, several handle data structures may be provided by sub-classing the corresponding data structures in query executor. Handle of RVF Execution (hFE) may track the information about input/output relation argument schemas, input mode, return mode, and result set. The handle of RVF Invocation Context (hFIC) may be used to control the execution of the RVF across calls. hFIC may have a pointer to the hFE, and track the information on number of calls, end-of-data status, memory context (e.g. life span one or multi-calls), and include a pointer to user-provided context known as scratchpad 1150 for retaining certain application data between calls. hFIC may have a pointer to hARG, a data structure that can be generated from RVF definition for keeping actual argument values across calls.

During function execution, the RVF container may use several system functions and macros to manipulate the hFIC structure and perform RVF execution. For example, the steps of RVF invocation for multi-calls may include the following:

In the first call, the RVF container may initialize the hFIC to persist across calls. The RVF container may evaluate each relation argument expressed by a relation name or a query in terms of launching a query evaluation sub-process where the argument query may be parsed, planned and executed. The RVF container may convert the complex DBMS internal tuple structures to an array of simple data structures to be passed into the "user-function." The RVF container may initiate other arguments and the scratchpad.

In a function call, the RVF container may set up for the hFIC and clearing any data left over from the previous pass. The RVF container may get non-static input argument values, and invoke user-function where the input and returned relations may be arrays of structures defined in the corresponding header files. DBMS internal call may not be made within the user-function body. The RVF container may convert the data generated by user-function back to DBMS internal data structures, and store them in the result-set pointed by hFE. If the return mode is TUPLE_MODE, the RVF container may return the first resulting tuple to the caller, or if the return mode is SET_MODE, the RVF container may return the entire result-set to the calling device. The RVF container may do clean up and end the RVF execution.

To ease the development of RVFs for analytics users, an RVF may be separated into at least two parts: RVF shell and user-function parts under specific input and return modes. Development of RVFs may be facilitated by providing high-level RVF Shell APIs for building the shell but the DBMS internal details can be hidden from RVF developers, and by generating RVF shells based on RVF specifications, input and return modes, and SROM. An analytics user may plug the "user-function" into 1170 the shell that may contain only application logic and may be free of DBMS internal data structures and calls.

Simple Relation-Object Mapping (SROM)

A functionality provided by RVF shells can be to convert DBMS internal data structures for relation objects into simplified data structures to be manipulated in "user-functions". Coding a conversion in terms of DBMS "system programs" can demand the developer have familiarity with system internal details which may be beyond the expertise of the typical analytical users. RVF development can be facilitated for the typical analytical users by defining the mappings from a relation schema to the data structures of the corresponding tuple (as C-struct) and tuple-set (as array of such C-structs). A language specific simple relation-object mapping protocol (SROM) may be used to represent the data mapping. For example, the SROM for C may be used to generate C typedefs in a header file 1130 based on the given relation schema and the correspondence between SQL types and C-types. User Defined Types (UDTs) with basic components may be used.

In the corner-kick image analysis example, the composite feature vector of an image may be represented by a FloatVector object. The SROM types may be declared as the following composite UDTs using Postgres.

```
CREATE TYPE FloatVectorType AS (
    mask BIT VARYING(100),
    floatVector float4 [ ]
);
```

The CKImages and CKSamples may use the following types.

```
CREATE TABLE CKImages (
    ID INTEGER NOT NULL,
    feature FloatVectorType
);
CREATE TABLE CKSamples (
    ID INTEGER NOT NULL,
    feature FloatVectorType
);
```

Based on the relation declarations, the following header file may generated for the user-function.

```
[HF1]    typedef struct {
             byte * mask;
             float4 * vector;
         } FloatVectorType;
[HF2]    typedef struct {
             int ID;
             FloatVectorType feature;
         } CKImage;
```

```
        [HF3]   typedef struct {
                    int ID;
                    FloatVectorType feature;
                } CKSample;
        [HF4]   typedef struct {
                    CKImage * CKImageArray;
                    int tuple_num;
                } CKImages;
        [HF5]   typedef struct {
                    CKSample * CKSampleArray;
                    int tuple_num;
                } CKSamples;
```

Based on these typedefs the user can provide functions allocCKImages(n) and deallocCKImages( ). The user-functions may be invoked in some API functions and passed in as pointers allowing separate generic APIs to be separated from application specific functions. The hARG data structure for holding the initial arguments of the RVF, like ck_rvf2_args, may be generated.

RVF-Shell APIs

Based on RVF specifications, invocation patterns, and SROM, a set of high-level RVF shell APIs may be provided for building the shell. These APIs can hide or remove the DBMS internal details from RVF developers or typical analytics users. RVF ck_rvf2 used as an example in Q5 may be used to show the use of these APIs.

The RVF may be constructed with TUPLE_MODE return for the closest sample image of each given image. The user-function find_closest_sample( ) may not involve any DBMS system internal data structure and function. The user-function may take ID and feature of an image and the array of KCSamples as input and return a relation as output. The input/output data of ck_rvf2 may be converted from/to the query processing internal objects by the appropriate shell APIs. The APIs (upper-case with RVF_prefix) may be illustrated by the following pseudo RVF that may be specific to the already registered input and return mode. Exception handling and on-error early returns may be used. For simplicity in the example, all exception handling and on-error early returns are omitted. A FIRST_CALL may be a NORMAL_CALL.

```
    SQLUDR_INT32 ck_rvf2(RVF_ARGS) {
        int rv; RVFCallContext *h; ck_rvf2_args *hARGS; CKSamples
        *samples;
        if (RVF_IS_FIRST_CALL( )) {
            h = RVF_FIRST_CALL_BEGIN( );
            RVF_ALLOC_ARGS(h->hARGS, &allocCk_rvf2_args);
            h->hARGS->Samples = (Samples *)
                RVF_GET_INPUT_RELATION(RVF_ARG(2),
                    &allocSamples);
            RVF_FIRST_CALL_END(h);
        }
        if (RVF_IS_NORMAL_CALL( )) {
            h = RVF_NORMAL_CALL_BEGIN( );
            Samples *samples = h->hARG->Samples;
            int ID =
            (int) RVF_GET_INPUT_TUPLE_FIELD(RVF_ARGS(0));
            FloatVectorType *feature = (FloatVectorType *)
                RVF_GET_INPUT_TUPLE_FIELD(RVF_ARGS(1),
                    &allocFeature( ));
            /*user-function*/
            int sid = find_closest_sample (ID, feature, samples);
            RVF_RETURN_NEXT(sid);
            RVF_NORMAL_CALL_END(h);
        }
        if (RVF_IS_LAST_CALL( )) {
            RVF_FREE (samples, &deallocSamples);
            RVF_FREE (h->hARGS, &deallocCk_rvf2_args);
            RVF_FINALIZE(h);
        }
        return rv;
    }
```

API RVF_GET_INPUT_RELATION( ) may retrieve the tuple-set of the specified relation or query result and populate the corresponding C-structure objects based on SROM. API RVF_RETURN_NEXT( ) may convert the result into the tuple format recognized by the query processor. API RVF_FREE may de-allocate memory using both the DBMS specific memory management utilities and memory management utilities provided for the data structures. The data structure memory management utilities may be used inside the user-function with the data structure passed in as a function pointer for keeping the generality of the API.

RVF-Shell Generation

RVF shell provisioning may be automated, e.g. the method and system may be generated from RVF specifications under the given input mode and return mode. Based on a well defined invocation pattern, the development of the "user-function" that contains application logic can be separated from the generation of the RVF-shell, and tools can be used for generating the RVF-shell automatically.

An embodiment of RVF-shell generation mechanism is illustrated in FIG. 11, where the separation of the system responsibilities 1110 from the user responsibilities 1120 are shown, and the system responsibility for generating RVF shell 200 may be automated. Based on the RVF declaration 1100 that can be stored in system meta tables, the system may generate 1160 the header file containing the RVF argument data structure declarations to be used in the "user-function". The system may generate the RVF shell skeleton including FIRST_CALL, NORMAL_CALL, and LAST_CALL from the RVF declaration. The system with the RVF declaration may generate API calls for retrieving argument relations, converting data structures; switching memory contexts, and allocating and de-allocating memories.

The user may provide the user-function containing application logic only without DBMS internal system calls and data structures. The user may interact and manipulate other initial data accessible to the user-function using the scratch-pad 1150. A complete RVF may be created by plugging the user-function in the RVF-shell.

For example, the declaration of RVF ck_rvf2 which may be stored in meta-tables may be built with the following mechanisms: A header generation utility RVF_RO_META_GEN ("ck_rvf2") which may be responsible for generating the header files HF1-HF5. A shell generation utility may be responsible for generating the RVF shell with RVF_SHELL_GEN ("ck_rvr2"). The FIRST_CALL, NORMAL_CALL, LAST_CALL in the generated RVF shell may provide the following functionalities in the execution of the RVF. In the FIRST_CALL, the shell generation utility may launch a system internal query to get the tuple-sets for CKSamples table in their DBMS-internal data structure. The shell generation utility may convert the results to the instance of C-structure CKSamples that contains an array of CKSample data structures as defined in the generated header file for passing in the user-function. In the NORMAL_CALL, the shell generation utility may make data conversion for the dynamic arguments and invoke the user-function. The shell generation utility may then convert the returned array of C-structures to DBMS-internal tuple-sets that may be accessible by the query executor. The shell generation utility may switch memory contexts according to the specified input and return mode (e.g. memory context for single query or for multi-calls). In the LAST_CALL, the shell generation utility may cleanup.

The RVF developer may code a function, illustrated in find_closest_sample:

find_closest_sample (ID, feature, samples);

The scratchpad 1150 for holding other initial data (other than CKSamples) may be null, as in the corner-kick example, but the scratchpad may contain an extern pointer to user defined initial values, and the user may be able to add any other data to be carried-on across calls.

The complete RVF may be built by plugging 1170 the user-function 130 into the shell 200. The pure application oriented user-function may be made independent of platform specific system calls. While a common set of invocation patterns may be provided, many applications can be easily pushed down to the DBMS layer as RVFs.

RVFs may be used to create set input and output for application modeling and generate efficiency of execution of UDFs by improving integration of UDFs with the query engine. RVFs allow the use of UDFs for complex applications. Efficiency in UDF execution is improved by tightly integrating the UDF with the query engine. The RVFs may remove the analytics users from the system internal details. The user-function with RVF shells makes the UDF technology practically usable in the syntheses of data intensive analytics computation and data management.

A UDF may contain system calls and system internal data structures, which may make the UDF hard to implement by users. A UDF may separate a shell from a user function where the shell handles system interactions and the user-function deals with application logic. A mechanism may generate the shell automatically based on the invocation pattern, and the entire UDF may be made by plugging-in the user-function to the shell. Building a UDF this way can focus the user's responsibility to the user-function without system details, such as internal database system calls.

Figure 12:
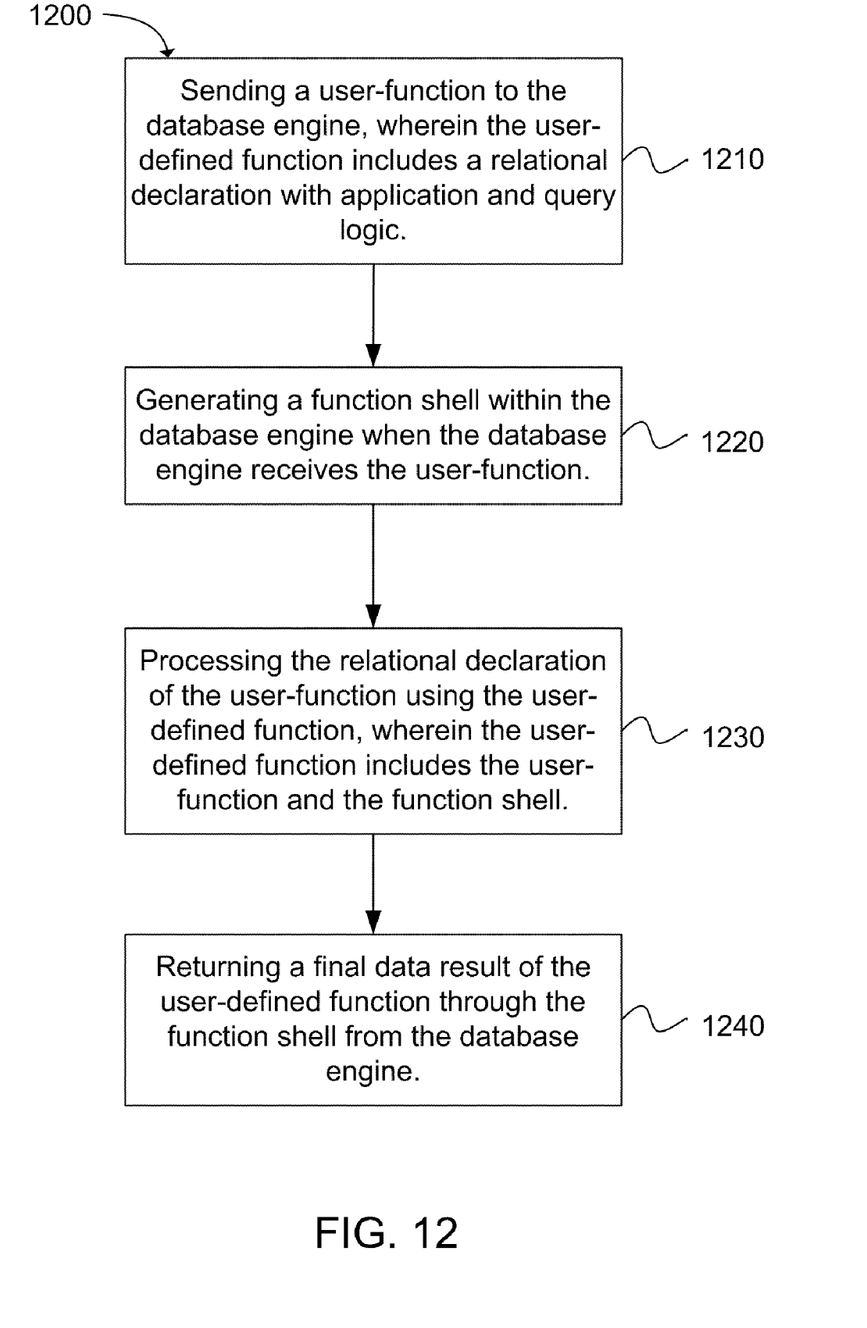
FIG. 12 is a flowchart illustrating a generation of a user-defined function (UDF) on a database engine of a database server in accordance with an embodiment.

Another embodiment provides a method 1200 for generating a user-defined function (UDF) on a database engine of a database server, as shown in the flow chart in FIG. 12. The method includes the operation of sending a user-function to the database engine 1210. The user-function may include a relational declaration with application and query logic. The operation of generating a function shell within the database engine when the database engine receives the user-function 1220 follows.

The method further includes processing the relational declaration of the user-function using the UDF 1230. The UDF includes the user-function and the function shell. The next operation of the method may be returning a final data result of the user-defined function through the function shell from the database engine 1240.

The method and system for generating or executing a user-defined function (UDF) on a database engine of a database server may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data. Additionally, the method and system for generating or executing a user-defined function (UDF) on a database engine of a database server may be downloaded as a computer program product transferred from a server or remote computer to a requesting or client device by way of machine readable data signals embodied in a carrier wave or other propagation medium.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for generating a user-defined function (UDF) on a database engine of a database server, comprising:
    sending a user-function to the database engine, wherein the user-function includes a relational declaration with application and query logic;
    generating a function shell within the database engine when the database engine receives the user-function;
    processing the relational declaration of the user-function using the UDF, wherein the UDF includes the user-function and the function shell; and
    returning a final data result of the UDF through the function shell from the database engine.

2. The method of claim 1, wherein processing the relational declaration of the user-function using the UDF further comprises:
    receiving an intermediate result from a query executor on the database engine, wherein the intermediate result is an intermediate database management system (DBMS) tuple data structure;
    converting the intermediate DBMS tuple data structure into a simple relation-object mapping structure within the database engine; and
    processing the simple relation-object mapping structure by the instructions of the UDF.

3. The method of claim 2, wherein the simple relation-object mapping structure is a data structure array in a non-database programming language.

4. The method of claim 1, wherein generating a function shell comprises:
    creating an input data structure within the function shell when a predefined input mode is included in the user-function; and
    generating a predefined function sequence for the UDF when the predefined input mode is included in the user-function.

5. The method of claim 1, wherein generating a function shell comprises:
    creating an return data structure within the function shell when a predefined return mode is included in the user-function; and
    generating a predefined function sequence for the UDF when the predefined return mode is included in the user-function.

6. The method of claim 1, wherein the relational declaration in the user-function sent to the database engine further comprises a relational schema input.

7. The method of claim 6, wherein the relational schema is selected from the group consisting of relational operators, sub-queries, and references to database tables.

8. The method of claim 6, wherein the relational declaration includes a plurality of non-nested relational schemas.

9. The method of claim 1, wherein a relational declaration further comprises application and query logic void of database management system (DBMS) data structures and internal DBMS system function calls.

10. The method of claim 1, wherein processing the relational declaration of the user-function using the UDF further comprises:
converting the relational declaration of the user-function into an database management system (DBMS) tuple data structure.

11. The method of claim 10, wherein processing the relational declaration of the user-function using the UDF further comprises:
calling an internal database system function, wherein the internal database system function processes the DBMS tuple data structure converted from the relational declaration data.

12. The method of claim 10, wherein processing the relational declaration of the user-function using the UDF further comprises:
initializing the values of each parameter of the DBMS tuple data structure for a query executor; and
maintaining cross-call data from sub-queries relations between each query process of the UDF.

13. The method of claim 1, wherein processing the relational declaration of the user-function using the UDF further comprises:
evaluating the relational declaration for syntax errors;
allocating memory in a memory module of the database according to a life-span of each relation in the relational declaration; and
releasing the allocated memory according to the life-span.

14. The method of claim 1, wherein the final data result further comprises a relational schema.

15. The method of claim 1, further comprising generating a user-function using an application programming interface (API).

16. A system for generating a user-defined function (UDF) on a database engine of a database server, comprising:
an application for sending a user-function, wherein the user-function includes a relational declaration with application and query logic;
a database engine on a database server for receiving the user-defined function; and
a function shell generated when the database engine receives the user-function, wherein the function shell processes the relational declaration of the user-function, calls and runs internal database system functions, and returns a data result to the application.

17. The system of claim 16, wherein the function shell runs internal database system functions on a plurality of database engines or processors.

18. A method for generating a user-defined function (UDF) on a database engine of a database server, comprising:
sending a user-function to the database engine, wherein the user-function comprises:
a relational function declaration with application and query logic,
a data mapping scheme, and
an invocation pattern;
generating a function shell from the user-function, wherein the function shell executes within the database engine when the database engine receives the user-defined function;
processing the user-function using the UDF, wherein the UDF includes the user-function and the function shell; and
returning a final data result of the UDF through the function shell from the database engine.

19. The method of claim 18, wherein generating the function shell further comprises:
generating header files for the user-defined function; and
constructing a function shell structure with instructions on the frequency of calling each argument referenced in the user-function.

20. The method of claim 18, wherein processing the user-function using the UDF further comprises:
retrieving query relations based on the invocation pattern;
converting data structures between application and query logic data structures and database management system (DBMS) tuple data structures; and
allocating and de-allocating memory in a memory module of the database according to a life-span of each relation in the user-defined function.

* * * * *